United States Patent [19]

Watanabe et al.

[11] Patent Number: 5,040,639
[45] Date of Patent: Aug. 20, 1991

[54] ELEVATOR VALVE APPARATUS

[75] Inventors: Shinya Watanabe, Hyogo; Hironori Sasaki, Kobe; Kaoru Nomichi, Ono; Yasushi Sotani, Kobe, all of Japan

[73] Assignee: Kawasaki Jukogyo Kabushiki Kaisha, Japan

[21] Appl. No.: 473,046

[22] Filed: Jan. 31, 1990

[51] Int. Cl.⁵ .............................................. B66B 1/26
[52] U.S. Cl. .................................................... 187/111
[58] Field of Search .............................. 187/110, 111

[56] References Cited

U.S. PATENT DOCUMENTS

| | | | |
|---|---|---|---|
| 4,637,495 | 1/1987 | Blain | 187/111 |
| 4,694,935 | 9/1987 | Lawrence | 187/111 |
| 4,715,478 | 12/1987 | Nakamura et al. | 187/111 |
| 4,932,502 | 6/1990 | Blain et al. | 187/111 |
| 4,938,119 | 7/1990 | Rita | 187/111 X |

FOREIGN PATENT DOCUMENTS 6225881 10/1953 Japan .

OTHER PUBLICATIONS

Copy of "Elevator Kai", 1986, No. 84, vol. 21, pp. 3-8.

Primary Examiner—A. D. Pellinen
Assistant Examiner—W. E. Duncanson, Jr.
Attorney, Agent, or Firm—Evenson, Wands, Edwards, Lenahan & McKeown

[57] ABSTRACT

An elevator valve apparatus for controlling the hydraulic supply flow to the hydraulic actuator and the hydraulic discharge flow from the actuator, comprises a solenoid proportional control valve device for ascending, a solenoid proportional control valve device for descending, and a valve control unit for controlling both of the control valve devices with a predetermined acceleration characteristic and a predetermined deceleration characteristic by an open loop control system.

Furthermore, if preferable, the valve control unit carries out oil temperature compensating control, pressure compensating control, pre-start pressure raising compensation control, and feedback control of the supply flow in the low speed ascending.

9 Claims, 14 Drawing Sheets

ELEVATOR VALVE APPARATUS

BACKGROUND OF THE INVENTION

The present invention relates to an elevator valve apparatus for controlling a hydraulic actuator for driving an elevator cage of a hydraulic elevator.

In general, the elevator cage of the hydraulic elevator is driven to ascend and descend by a hydraulic cylinder through or without through pulleys. In order to drive to ascend and descend the elevator cage with a predetermined speed characteristic, it is necessary to control supply flow of hydraulic oil supplied from a hydraulic pump to the hydraulic cylinder and discharge flow from the hydraulic cylinder to an oil tank with a predetermined characteristic.

Generally, by means of controlling bleed-off flow bleeded off from discharge flow of a fixed discharge hydraulic pump, the supply flow is controlled indirectly.

In the elevator valve apparatus, there are provided with a solenoid proportional control valve means for ascending which controls the bleed-off flow, and a solenoid proportional control valve means for descending which controls the discharge flow from the hydraulic cylinder.

In one system called a pilot system, each of above control valve means is comprising a pilot solenoid proportional control valve and a flow control valve which is operated by the pilot pressure generated with the pilot control valve.

In other system called a direct drive system, each of above control valve means is comprising a solenoid flow control valve.

Furthermore, the elevator valve apparatus is provided with a control means for controlling above two control valve means. As the control means, two systems have been known. One controls the control valve means by open loop control according to a predetermined characteristic and the other controls the control valve means by feedback control in accordance with a predetermined characteristic and actual supply flow and discharge flow which are detected by a flow detecting means.

For example, in No. 84 (1986), vol. 21 of [Elevator Kai] issued by Nippon Elevator Association, described is an elevator valve apparatus comprising a control valve means of the direct drive system and a control means of the feedback control system. In addition, in Japanese Patent Publication No. 62-25881, disclosed is a hydraulic control apparatus similar to that of above apparatus.

Generally, the cage of the hydraulic elevator is driven to ascend and descend with a given velocity characteristic including acceleration, high speed movement, deceleration, low speed movement and rapid deceleration for stopping, in each of ascending and descending.

In the prior elevator valve apparatus, the velocity characteristic is an approximately trapezoidal characteristic in which the velocity in acceleration and deceleration varies linearly, and therefore the magnitude of accelerating and decelerating rate is rather large in starting of acceleration and deceleration and also in stopping of acceleration and deceleration, and therefore this reduces the comfortability in riding for the passengers.

Furthermore, in the case where the loading pressure dependent on the loading weight fluctuates largely, the hydraulic pressure in the cylinder fluctuates rapidly in starting of ascending to induce an oscillation with shock on the cage or to cause a delay in starting of ascending.

In the control means of the feedback control system, there are some disadvantages such that a flow detecting means of large capacity has to be provided, the initial adjustment of the feedback control system is very troublesome, hunting is caused easily when the control system is unstable, and so on.

On the other hand, in the control means of the open loop control system, there is a disadvantage such that it is difficult to control ascending or descending of the cage with a predetermined characteristic, since the supply flow and the discharge flow fluctuate when the discharge flow of the pump and the passing flow through the control valve means fluctuate due to the fluctuations in the loading pressure in the hydraulic cylinder corresponding to the oil temperature and the loading weight in the cage.

Furthermore, during operating for long period after the installation of the hydraulic elevator, the volumetric efficiency of the hydraulic pump decreases due to the increase of the interior leakage flow, then the discharge flow from the pump decreases gradually. That is, when the discharge flow of the hydraulic pump decreases, the ascending acceleration performance deteriorates, and the ascending maximum speed decreases, ascending low speed after deceleration and before stopping decreases. The deterioration of the acceleration performance and the decrease in the ascending maximum speed do not cause vital problems. However, when the ascending low speed decreases, the stopping position of the cage fluctuates, since a rapid deceleration for stopping is done is a constant minute time, and the cage stops at a level lower than the floor level where the cage should stop. Thus, the stopping positional accuracy decreases remarkably, and this is a vital problem for the elevator.

The same problem also occures in the case where the supply flow fluctuates due to fluctuations of the oil temperature or the loading hydraulic pressure in the cylinder.

SUMMARY OF THE INVENTION

The object of the present invention are in the followings.

The first object is to improve the comfortability in riding by means of reducing the accelerating rate and the variable rate of the acceleration in starting of accelerating and decelerating and in stopping of accelerating and decelerating. The second object is to provide the valve control unit of open loop control with oil temperature compensating function and pressure compensating function. The third object is to prevent the oscillation of the cage due to the fluctuation of the hydraulic loading pressure in starting of ascending. The fourth object is to realize feedback control of the supply flow of the hydraulic oil in the low speed ascending with a flow detecting device having a small size and simple structure, and to secure the stopping positional accuracy in stopping of ascending.

In order to achieve above objects, the elevator valve apparatus according to the present invention comprises, at least, a solenoid proportional control valve device for ascending, a solenoid proportional control valve device for descending, and a valve control unit for controlling both of the control valve devices with a predetermined acceleration characteristic and a predetermined deceleration characteristic, based on command signals supplied from outside.

If preferable, the valve control unit comprises oil temperature compensating function, hydraulic pressure compensating function, and pre-start hydraulic pressure raising compensation function. Furthermore, if preferable, the elevator valve apparatus comprises a stroke sensor for detecting the supply flow of the hydraulic oil in the low speed ascending through the movement stroke of a valve spool of a check valve, and feedback control function for controlling the supply flow in the low speed ascending based on the output of the stroke sensor.

BRIEF DESCRIPTION OF DRAWINGS

The drawings show the embodiments of the present invention.

FIG. 3 is a diagram showing the characteristic of stroke vs. flow of the check valve.

DETAILED DESCRIPTION OF THE PREFERRED EMBODIMENTS

Figure 1:
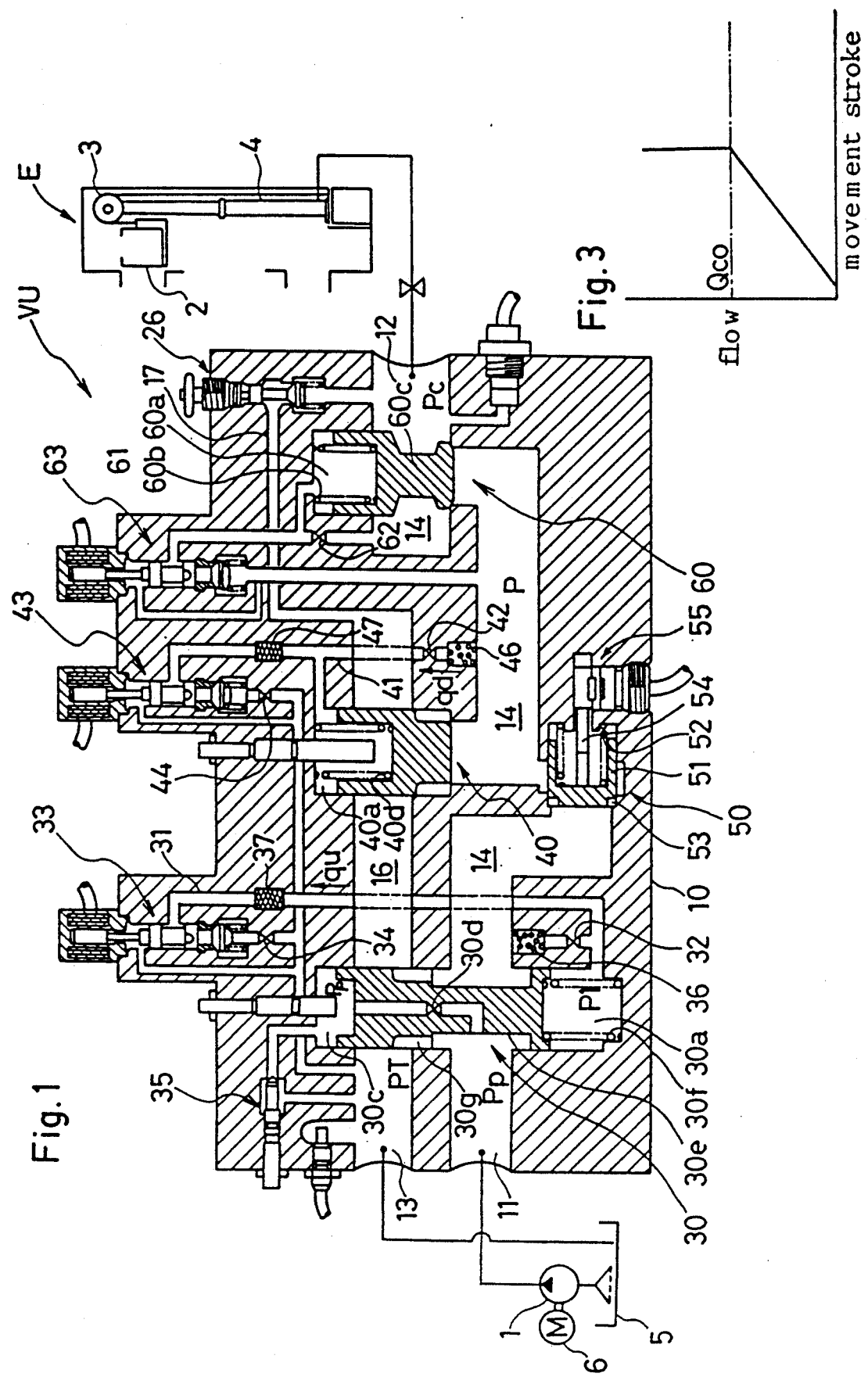
FIG. 1 is a sectional view of the elevator valve unit.

Hereinafter, preferred embodiments of the present invention will be described with reference to the accompanying drawings.

First Embodiment

FIG. 1–FIG. 21

An elevator valve apparatus EV according to this embodiment is installed in a hydraulic circuit which communicates a fixed discharge oil pump 1 for a hydraulic elevator E and a hydraulic cylinder 4 for driving an elevator cage 2 to ascent and descent through a pulley 3.

When the cage 2 ascends, the elevator valve apparatus EV controls bleed-off flow Qb bleeded off from discharge flow Qp from the pump 1 to a oil tank 5, thereby the ascending movement of the cage 2 is controlled by means of controlling supply flow Qc. When the cage 2 descends, the elevator valve apparatus EV controls discharge flow Qe from the hydraulic cylinder 4 to the tank 5, thereby the descending movement of the cage 2 is controlled.

This elevator valve apparatus EV comprises an elevator valve unit VU disposed in a valve housing 10 and a control unit CU for controlling the elevator valve unit VU in accordance with various external command signals from a control box in the cage 2.

Figure 2:
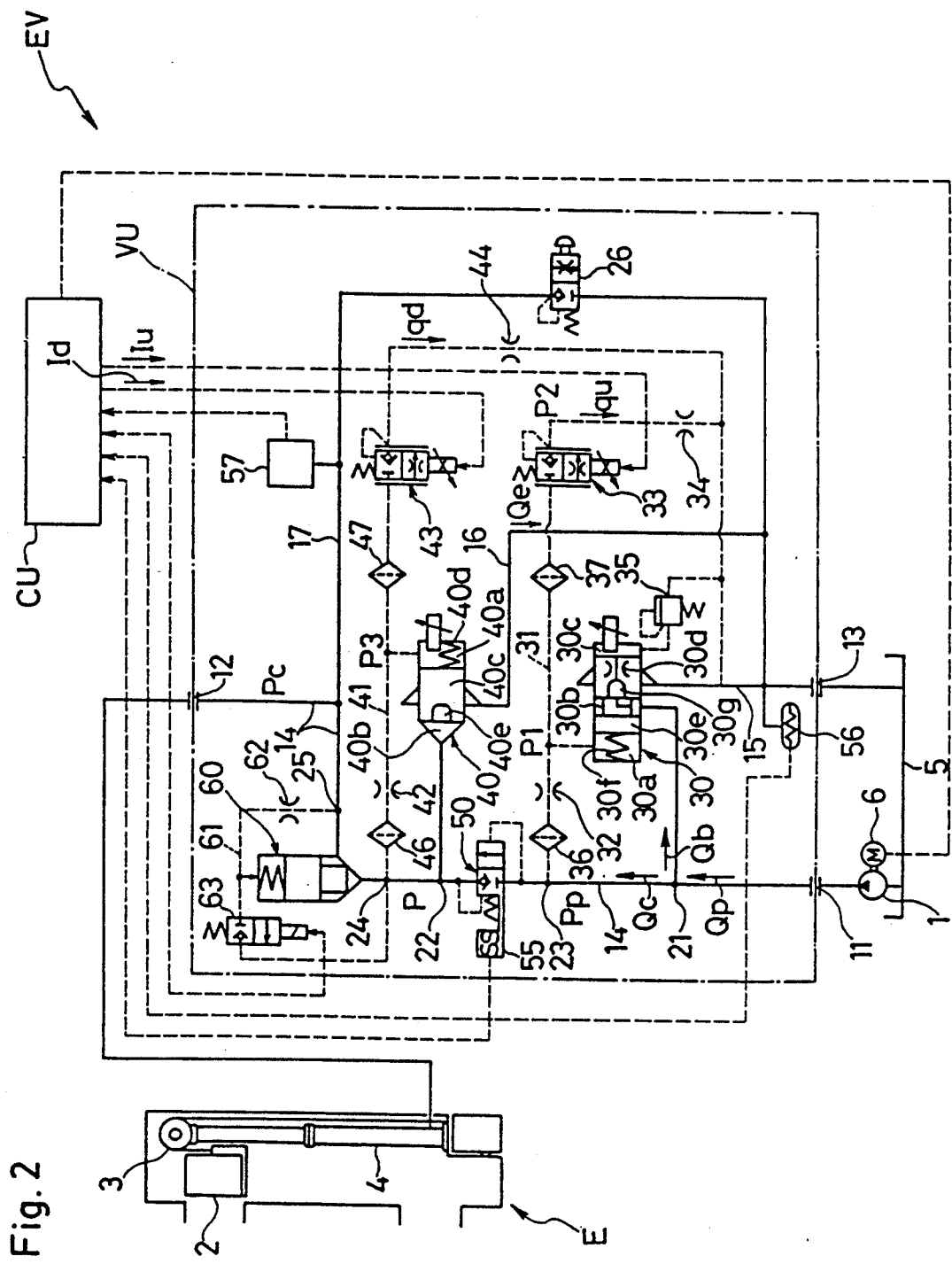
FIG. 2 is an equivalent hydraulic circuit diagram of the elevator valve unit in FIG. 1.

FIG. 1 is a sectional view of the elevator valve unit VU, and FIG. 2 is an equivalent hydraulic circuit diagram of the elevator valve unit VU.

First, the configuration of the elevator valve unit VU will be described with reference to FIG. 1 and FIG. 2. Firstly, various ports and oil passages will be described.

The valve housing 10 has a pump port 11 connected to the pump 1, a cylinder port 12 connected to the hydraulic cylinder 4, and a tank port 13 connected to the tank 5.

In the valve housing 10, there are provided with a main oil passage 14 connecting the oil port 11 and the cylinder port 12, a first oil passage 15 branching off from a first branch portion 21 on an upstream part of the main oil passage 14 and being communicated with the tank port 13, a second oil passage 16 branching off from a second branch portion 22 on a downstream part of the main oil passage 14 and being communicated with the tank port 13, and a third oil passage 17 branching off from the main oil passage 14 near the cylinder port 12 and being communicated with the tank port 13.

Next, a solenoid proportional control valve means for ascending will be described.

The solenoid proportional control valve means for ascending for controlling the bleed-off flow Qb bleeded off and discharged to the tank 5 from the upstream part of the main oil passage 14 to the first oil passage 15, comprises a flow control valve 30 for ascending disposed in the first oil passage 15, a first pilot oil passage 31 branching off from a third branch portion 23 of the main oil passage 14 and being communicated with the tank port 13, a first fixed choke 32, a pilot solenoid proportional control valve 33 and a second fixed choke 34. The first fixed choke 32, the pilot solenoid proportional control valve 33 and the second fixed choke 34 are disposed in the first pilot oil passage 31 in series from the upstream side.

The flow control valve 30 is a normally open type valve, and the pilot pressure $P1$ in the downstream side of the first fixed choke 32 is applied to the pilot chamber 30$a$, the oil pressure $Pp$ in the upstream part of the main oil passage 14 is applied to the circulating chamber 30$b$, and the oil pressure $Pp$ from the circulating chamber 30$b$ through a choke 30$d$ is applied to the pressure receiving chamber 30$c$. When the differential pressure $\Delta Pu = (Pp - P1) = 0$, since the oil pressure in the pilot chamber 30$a$ and the oil pressure in the pressure receiving chamber 30$c$ are equal, a spool 30$e$ is held at its full open position, thereby all of the discharge flow $Qp$ is discharged to the tank 5 through a notch 30$g$ of the flow control valve 30. When the differential pressure $\Delta Pu$ is generated substantively, the spool 30$e$ moves toward its closed position against the resilient force of a spring 30$f$ in accordance with the differential pressure $\Delta Pu$, thereby bleed-off flow $Qb$ through the notch 30$g$ decreases and the supply flow $Qc$ to the hydraulic cylinder 4 increases.

The pilot control valve 33 is a pressure reducing valve in construction, and when solenoid driving current $Iu$ is zero, it is closed, and when the driving current $Iu$ is supplied, it is opened while feedbacking with the secondary pressure $P2$ to set the secondary pressure $P2$ which is proportional to the driving current $Iu$, irrespectively of the primary pressure $P1$. Corresponding to this secondary pressure $P2$, passing flow $qu$ through the second fixed choke 34 is determined, and the pressure drop $\Delta Pu$ at the first fixed chock 32, which is proportional to the passing flow $qu$, is generated. Accordingly, the differential pressure $\Delta Pu$ increases in proportion to the magnitude of the solenoid driving current $Iu$, and then the bleed-off flow $Qb$ from the flow control valve 30 decreases, thereby the supply flow $Qc$ to the hydraulic cylinder 4 increases. In FIG. 1 and FIG. 2, reference numeral 35 denotes a safety valve and reference numerals 36.37 denote a filter respectively.

Next, a solenoid proportional control valve means for descending will be described.

The solenoid proportional control valve means for descending for controlling, when the cage 2 descends, the discharge flow $Qe$ discharged from the hydraulic cylinder 4 to the tank 5 through the second oil passage 16, comprises a flow control valve 40 for descending disposed in the second oil passage 16, a second pilot oil passage 41 branching off from a fourth branch portion 24 of the main oil passage 14 and extending to the tank port 13, a first fixed choke 42, a pilot solenoid proportional control valve 43 for descending, and a second fixed choke 44. The first fixed choke 42, the pilot solenoid proportional control valve 43, and the second fixed choke 44 are disposed in the second oil passage 41 in series from the upstream side.

The flow control valve 40 is a normally closed type valve, and a pilot pressure $P3$ in the downstream side of the first fixed choke 42 is applied to the pilot chamber 40$a$, and a valve internal pressure $P$ in the second branch portion 22 of the main oil passage 14 is applied to the circulating chamber 40$b$. When the differential pressure $\Delta Pd = (P - P3) = 0$, since the oil pressure in pilot chamber 40$a$ and the oil pressure in circulating chamber 40$b$ are equal, a spool 40$c$ is held at its full closed position by a spring 40$d$. Since an auxiliary check valve 60 described hereinafter opens when the cage 2 descends, the valve internal pressure $P$ and the cylinder port pressure $Pc$ become equal. When the differential pressure $\Delta Pd$ is generated substantively, the spool 40$c$ moves toward its open position against the resilient force of the spring 40$d$ in accordance with the differential pressure $\Delta Pd$, and thus the discharge flow $Qe$ increases.

The pilot control valve 43 is a same type of valve as the pilot control valve 33 aforementioned. In proportion to the solenoid driving current $Id$, a flow $qd$ through the second pilot oil passage 41 increases, the pressure drop $\Delta Pd$ at the first fixed choke 42 is generated, thereby the discharge flow $Qe$ through the flow control valve 40 increases. In FIG. 1 and FIG. 2, reference numerals 46·47 denote a filter respectively.

Next, descriptions will be made on a check valve 50 and a stroke sensor 55.

Between the third branch portion 23 and the second branch portion 22 of the main oil passage 14, there is provided a check valve 50 which permits oil to flow from the pump port 11 to the cylinder port 12, and adjacent to the check valve 50, the stroke sensor 55 for detecting a moving stroke of a valve body 51 of the check valve 50 is fixedly mounted in the valve housing 10.

As shown in FIG. 1, the check valve 50 is configurated so as to make a valve aperture 53 open or close with the valve body 51 which is biased toward its closed position by a spring 52. When the cage 2 ascends, the check valve 50 opens corresponding to the supply flow $Qc$. In the ascending process of the cage 2, as shown in FIG. 3, the characteristic between valve body moving stroke and flow is linear, in the range not more than a predetermined flow $Qco$ which is approximately equal to the supply flow $Oc$ at the final stage of deceleration process of the cage 2.

The stroke sensor 55 detects the moving stroke of the valve body 51 in order to detect the supply flow $Qc$ when the cage 2 ascends at a low speed. The stroke sensor 55 is configurated so as to detect electrically the moving stroke of a rod 54, which is fixedly mounted at the back side of the valve body 51, with a sensor such as magneto resistive device. The detected signal is fed to the control unit CU.

Next, descriptions will be made on an auxiliary check valve 60 and a pilot solenoid switching valve 63.

Between the fourth branch portion 24 and the cylinder port 12 of the main oil passage 14, there is provided with the auxiliary check valve 60 for stopping a flow from the cylinder port 12 to the second oil passage 16. In a pilot passage 61 branching off from the main oil passage 14 at a fifth branch portion 25 between the cylinder port 12 and the auxiliary check valve 60 and extending to the fourth branch portion 24, there are provided with a fixed choke 62 and the switching valve 63 in series sequentially from the fifth branch portion 25, and a pilot pressure between the fixed choke 62 and the switching valve 63 is applied to the pilot chamber 60$a$ of the auxiliary check valve 60.

The switching valve 63 is switched to its open position by the control unit CU when a cage descent command signal is input to the control unit CU. Since the cylinder port pressure Pc is applied to the pilot chamber 60a when the switching valve 63 is held at its closed position, a valve body 60c is held at its closed position by a spring 60b. When the switching valve 63 is switched to its open position in response to the descent command, since the hydraulic oil is permitted to flow from the downstream part of the main oil passage 14 adjacent to the cylinder port 13 to increase the valve internal pressure P, the valve body 60c of the auxiliary check valve 60 is switched to its open position. At this time, since an oil pressure in the pilot chamber 60a is lower than the cylinder port pressure Pc by the pressure drop at the fixed choke 62, the valve body 60c is held at its open position and the hydraulic oil discharged from the hydraulic cylinder 4 flows through the downstream part of the main oil passage 14 and the auxiliary check valve 60 to the second oil passage 16. In the third oil passage 17, there is provided with a manually operated safety valve 26.

Next, descriptions will be made on a control system incorporated in the elevator valve apparatus EV.

The control unit CU receives a plurality of external command signals fed from the control box in the cage 2, and various signals from the stroke sensor 55, an oil temperature sensor 56 and a pressure sensor 57 and controls the control valves 33.34, the switching valve 63 and the motor 6 for driving hydraulic pump 1.

The oil temperature sensor 56 is, for example, a thermister for converting the oil temperature to electric signals. This oil temperature sensor 56 is incorporated in the first oil passage 15 or in the second oil passage 16 adjacent to the tank port 13. The detection signals of the oil temperature sensor 56 is fed to the control unit CU. The pressure sensor 57 detects electrically the cylinder port pressure Pc applied to the hydraulic cylinder 4 and is incorporated in the third oil passage 17 adjacent to the cylinder port 12. The detection signals of the pressure sensor 57 is fed to the control unit CU.

Next, descriptions will be made on the control unit CU with reference to FIG. 4.

Figure 4:
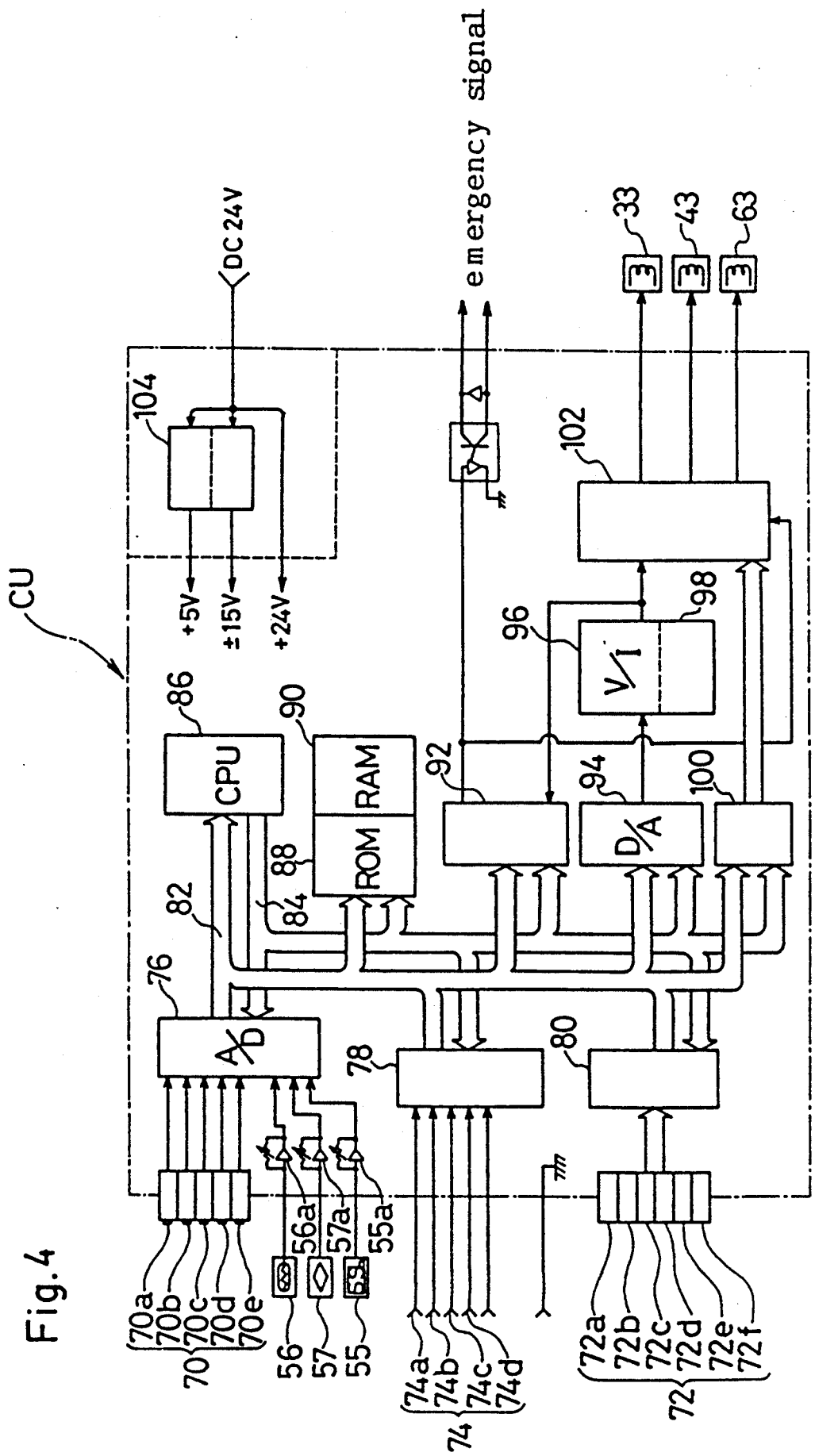
FIG. 4 is a block diagram of the control unit.

The control unit CU is provided with an analog volume group 70 for setting various speeds of the cage 2 at the installation of the hydraulic elevator E, a dip switch group 72 for setting various set times relating to the movement of the cage 2 at the installation of the hydraulic elevator E, an input terminal group 74 for receiving a plurality of external signals from the control box in the cage 2 in response to operations of the switch board in the cage 2 or various limit switches disposed corresponding to each floor level, an A/D convertor 76 for converting each of analog signals fed from the analog volumes group 70, the oil temperature sensor 56, the pressure sensor 57 and the stroke sensor 55 to digital signals, a first input interface 78 for receiving command signals from the input terminal group 74, a second input interface 80 for receiving set time signals from the dip switch group 72, a data bus 82 and an address bus 84 connected as shown in FIG. 4, a microcomputer including a CPU (Central Processing Unit) 86 and a ROM (Read Only Memory) 88 and a RAM (Random Access Memory) 90, an alarm output circuit 92, a D/A convertor 94 for converting digital control signals for controlling the pilot control valves 33.34 and the pilot switching valve 63, a V/I conversion circuit 96 for converting analog voltage control signals from the D/A convertor 94 to current signals, a dither circuit 98 included in the V/I conversion circuit 96, an output control circuit 102 for feeding driving currents to the solenoids of the pilot control valves 33.43 and the pilot switching valve 63 in accordance with the signals for commanding ascending or descending which are fed from the output interface 100, and a power supply circuit 104 for supplying regulated voltages of DC 5 V and ±15 V for controlling.

Detection signals from the oil temperature sensor 56, the pressure sensor 57 and the stroke sensor 55 are fed to the A/D convertor 76 through level adjusting operational amplifiers 56a.57a.55a, respectively. In addition, the control unit CU is also provided with a output circuit (not shown in FIG. 4) for driving the motor 6.

A plurality of analog volumes 70a–70e of the volume group 70 are for initial setting of the ascending high speed Vut, the ascending low speed Vul, the ascending start, the descending high speed Vdt, and the descending low speed Vdl, respectively.

A plurality of terminals 74a–74d of the input terminal group 74, are supplied with a drive command signal DS, a low speed descent command signal LDS, a low speed ascent command signal LUS, a high speed descent command signal HDS, and a high speed ascent command signal HUS, respectively, from outside. (refer to FIG. 5)

A plurality of dip switches 72a–72f of the dip switch group 72 are for initial setting of an ascending acceleration time tua, an ascending deceleration time tud, an ascending stop deceleration time tus, a descending acceleration time tda, a descending deceleration time tdd, and a descending stop deceleration time tds, respectively. (refer to FIG. 5) The set times t1, t2 and t3 in FIG. 5 are set in the control program.

In the ROM 88 of the microcomputer, the control program for controlling the solenoid control valves 33.43 and the solenoid switching valve 63 as described later is stored beforehand. The RAM 90 is provided with various work memories necessary for processing the control program.

Figure 5:
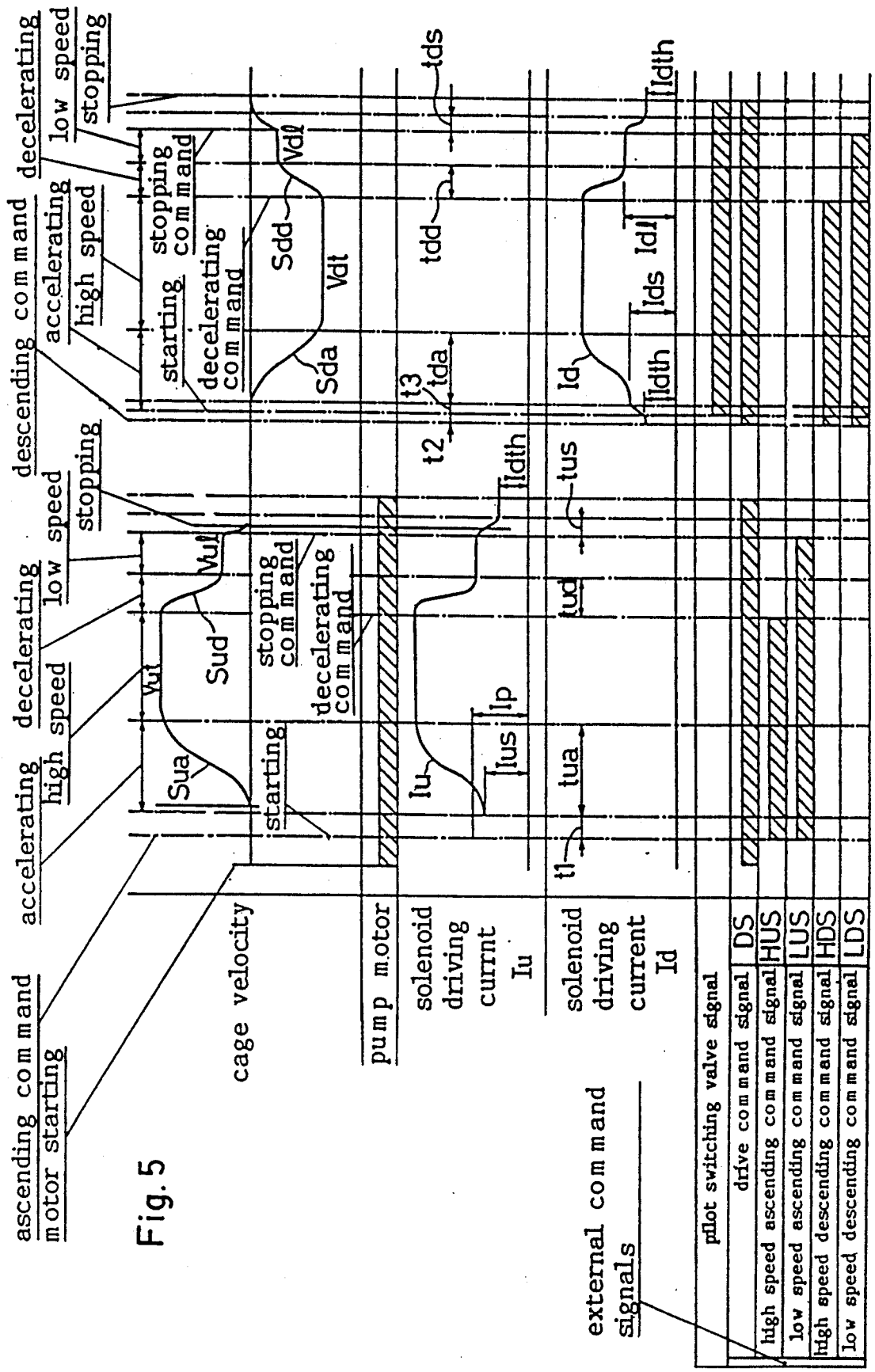
FIG. 5 is a time chart showing the cage speed, the solenoid driving current Iu·Id and the external command signals etc.

Controlling characteristics for controlling the elevator valve unit VU with the control unit CU is shown in FIG. 5.

In case of elevating the cage 2, the motor 6 is actuated in response to the input of the drive command signal DS and after receiving the high speed and low speed ascent command signals HUS·LUS, acceleration of the cage 2 starts, and the cage 2 is accelerated for the ascending acceleration time tua and then driven to ascent with a high speed Vut until the high speed ascent command signal HUS turns off.

When the signal HUS has turned off, deceleration of the cage 2 starts, and the cage 2 is decelerated for the ascending deceleration time tud and then driven to ascend with the low speed Vul until the low speed ascent command signal LUS turns off, then the cage 2 is decelerated for the set time tus to stop. And when the drive command signal DS has turned off, the motor 6 stops.

In case of lowering the cage 2, since the signals HDS·LDS are input even if the drive command signal DS is input, the motor 6 does not start. After receiving the drive command signal DS, acceleration of the cage 2 starts without driving the motor 6, and the cage 2 is accelerated to descend for the descending acceleration time tda and then driven to descend with the high speed Vdt until the high speed descent command signal HDS turns off.

When the signal HDS has turned off, deceleration of the cage 2 starts, and the cage 2 is decelerated for the descending deceleration time tdd and then driven to descend with a constant low speed Vdl until the low speed descending signal LDS turns off, then the cage 2 is decelerated for the set time tds to stop.

Since the variable rate of acceleration influences significantly on comfortability in riding, it is desirable to reduce the acceleration and the variable rate of acceleration to the utmost, at the initial and final stages in acceleration and deceleration. Consequently, in ascending process, the cage 2 is accelerated with an S-character pattern acceleration characteristic Sua at the accelerating stage and is decelerated with an S-character pattern deceleration characteristic Sud at the decelerating stage.

Similarly, in descending process, the cage 2 is accelerated with an S-character pattern acceleration characteristic Sda at the acceleration stage and is decelerated with an S-character pattern deceleration characteristic Sdd.

In the case where the elevator E is installed newly, the following control is carried out by the microcomputer of the control unit CU at its initializing stage.

The acceleration characteristic Sua in ascending process is determined by computation so as to be a predetermined suitable S-character pattern based on the high speed Vut in ascending and ascending acceleration time tua. The deceleration characteristic Sud is determined by computation so as to be a predetermined suitable S-character pattern based on the high speed Vut, the low speed Vul and the ascending deceleration time tud. Such similar control is also carried out in determining the acceleration characteristic Sda and the deceleration characteristic Sdd in descending process.

After speed characteristics of the cage 2 is determined as described above, each of standard driving currents of solenoid driving currents Iu·Id corresponding to the standard oil temperature (for example 15° C.) and the standard oil pressure Pco in the hydraulic cylinder 4 when the cage 2 is empty, is determined respectively by computation according to the control program, and then the results are stored in the work memories of the RAM 90.

Figure 6:
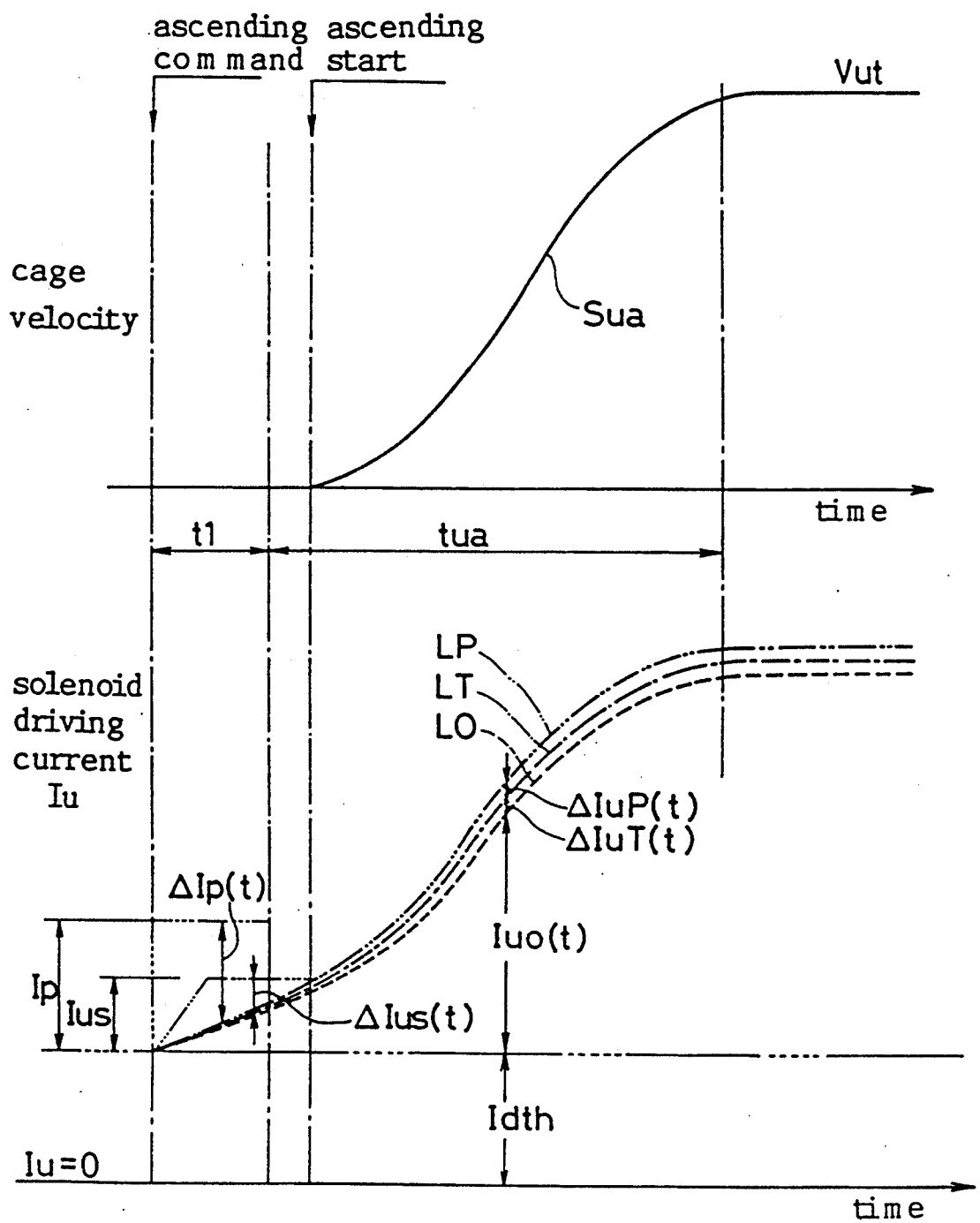
FIG. 6 is an explanatory diagram illustrating compensated amount of the driving current Iu in ascending process.

As shown in FIG. 6, when the standard driving currents IuO (t) is expressed as a function of time in ascending process of the cage 2, the solenoid driving current Iu is as follows.

$$Iu = IuO(t) + Idth \quad (1)$$

To each solenoid of the pilot control valves 33.34, high frequency dither current Idth is always supplied. This dither current Idth is for smoothing the valve spool movement and is supplied from the output control circuit 102 in accordance with high frequency control pulses fed from the dither circuit 98. However, with this dither current Idth, the spool is only oscillated in high speed without opening its internal oil passage.

Here, supplementary explanations will be made. Before receiving the ascent commands which are given as command signals HUS and LUS, since all amount of the discharge flow Qp is bleeded off from the first oil passage 15, the oil pressure Pp in the upstream part of the main oil passage 14 is lower than the cylinder port pressure Pc. Therefore, the pressure Pp increases after starting of the supply of solenoid driving current Iu in according to the ascent command, and then when the pressure Pp has become higher than the pressure Pc, the cage 2 starts ascending. Hereinafter, descriptions will be made on various controls to be carried out after installation and in practical use of the elevator E, such as temperature compensation control, pressure compensation control, prestarting pressure-up control and pre-starting preceding pressure-up control in the ascending process, and feedback control of the supply flow in the low speed ascending.

Figure 7:
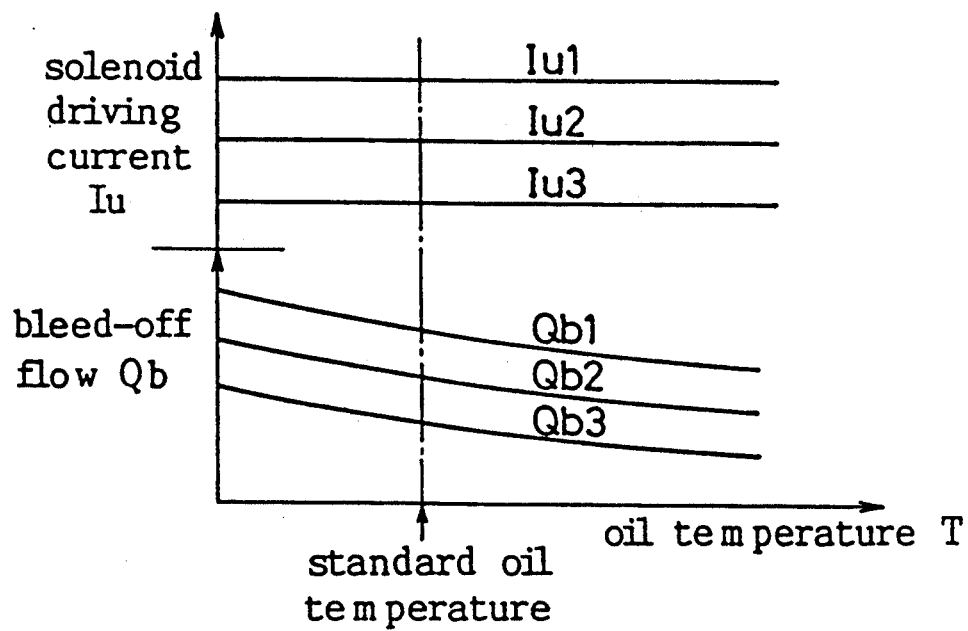
FIG. 7 is a diagram showing relationship of the oil temperature, the solenoid driving current and the bleed-off flow in the case where the temperature compensation control is not applied.
Figure 8:
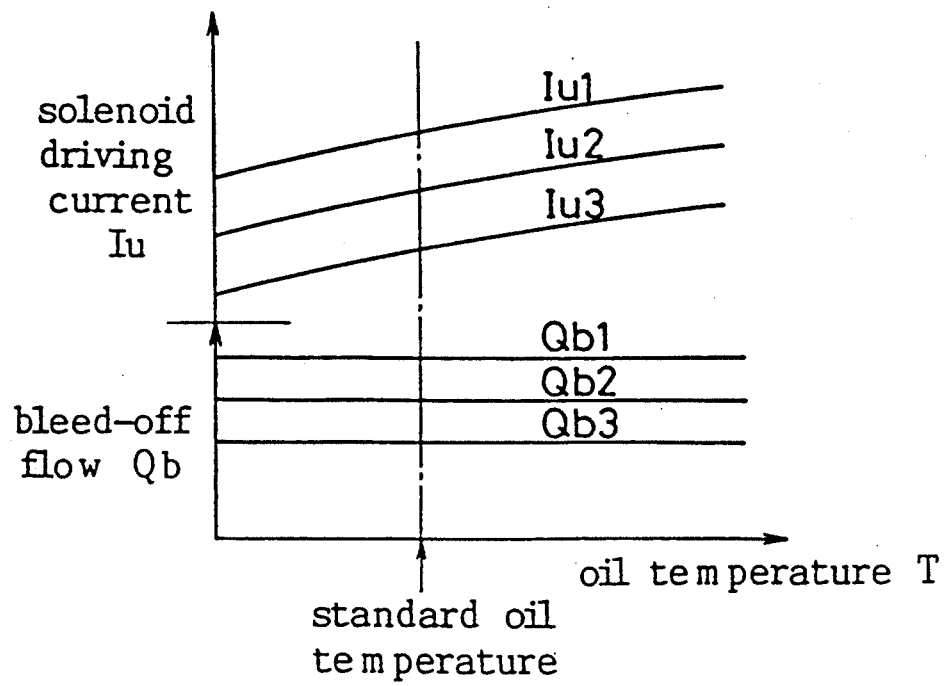
FIG. 8 is a diagram corresponding to FIG. 7 in the case where the temperature compensation control is applied.

The temperature compensation control will be described first with reference to FIG. 6–FIG. 10. If the oil temperature and the cylinder port pressure Pc are both in the standard state, the predetermined ascending speed characteristic and descending characteristic of the cage 2 are attained with the solenoid driving current Iu (shown as a curve LO in FIG. 6) given in the formula (1). However, when the oil temperature is higher than the standard temperature as shown in FIG. 7, since the pressure drop ΔPu at the first fixed choke 32 in the first pilot passage 31 decreases due to reduction in viscosity of the oil, and therefore the bleed-off flow Qb decreases, even if the solenoid driving current Iu of the pilot control valve 33 does not fluctuate. Accordingly, in order to compensate the decrease of the bleed-off flow Qb, the solenoid driving current Iu is compensated to increase corresponding to the increase of the oil temperature and the magnitude of the driving current Iu, as shown in FIG. 8. Similar temperature compensation control as above is also carried out for the pilot control valve 43, and the solenoid driving current Id is compensated to increase corresponding to the increase of the oil temperature and the increase of the driving current Id.

Figure 9:
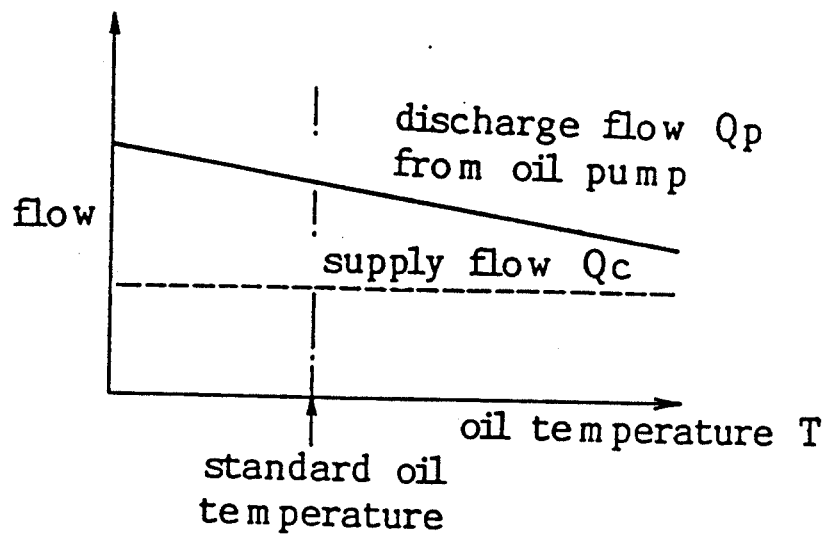
FIG. 9 is a diagram showing relationship of the oil temperature, the discharge flow and the supply flow.
Figure 10:
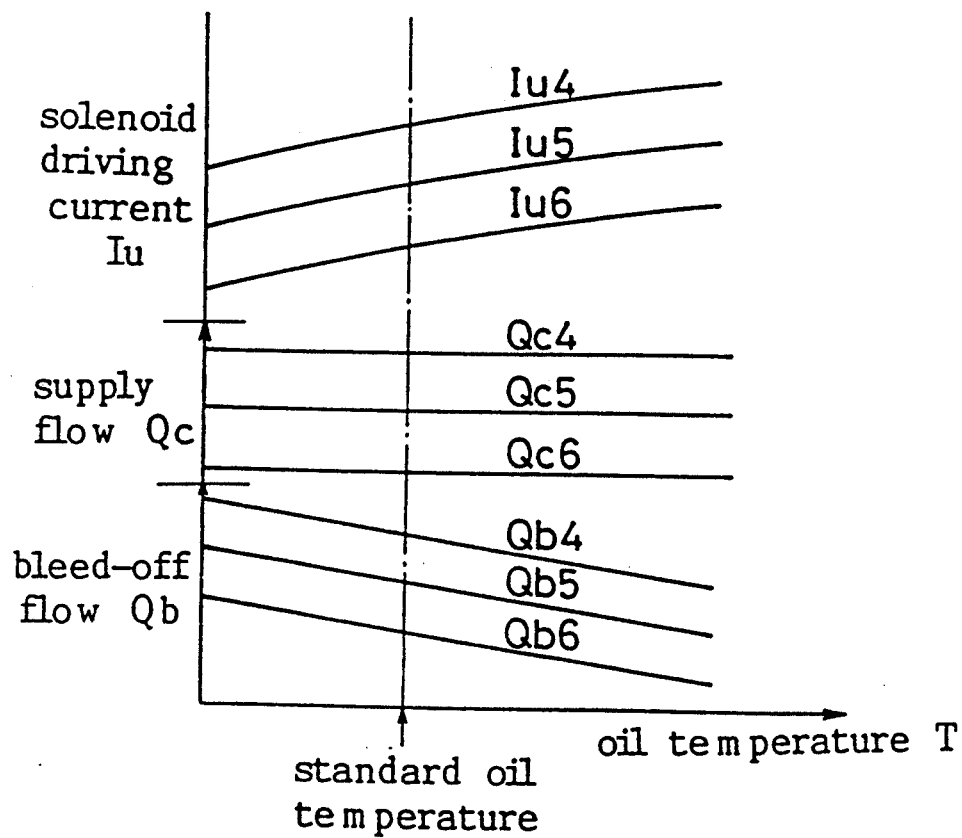
FIG. 10 is a diagram showing relationship of the solenoid driving current, the supply flow and the bleed-off flow in the case where the temperature compensation control is applied.

Furthermore, since the flow of interior oil leakage in the pump 1 increases corresponding to reduction in viscosity of the oil due to rising of the oil temperature, the volumetric efficiency of the oil pump 1 reduces, and the discharge flow Qp decreases, as shown in FIG. 9. Accordingly, in order to compensate the decrease of the discharge flow Qp, the driving current Iu is compensated to increase corresponding to the increase of the oil temperature and the magnitude of driving current Iu, and thus the bleed-off flow Qb is compensated to decrease, as shown in FIG. 10. Expressing the compensated amount ΔIuT (t) of driving current Iu, which is obtained by the oil temperature compensation control, as a function of time, the driving current Iu given in the formula (1) (shown as a curve LT in FIG. 6) will be modified as follows.

$$Iu = IuO(t) + Idth + \Delta IuT(t) \quad (2)$$

The driving current Id is also modified similarly. On the other hand, when the oil temperature is lower than the standard temperature, both of the driving currents Iu·Id are compensated to decrease similarly as above.

Next, descriptions will be made on the pressure compensation control based on the cylinder port pressure Pc with reference to FIG. 6 and FIG. 11–FIG. 14.

Figure 11:
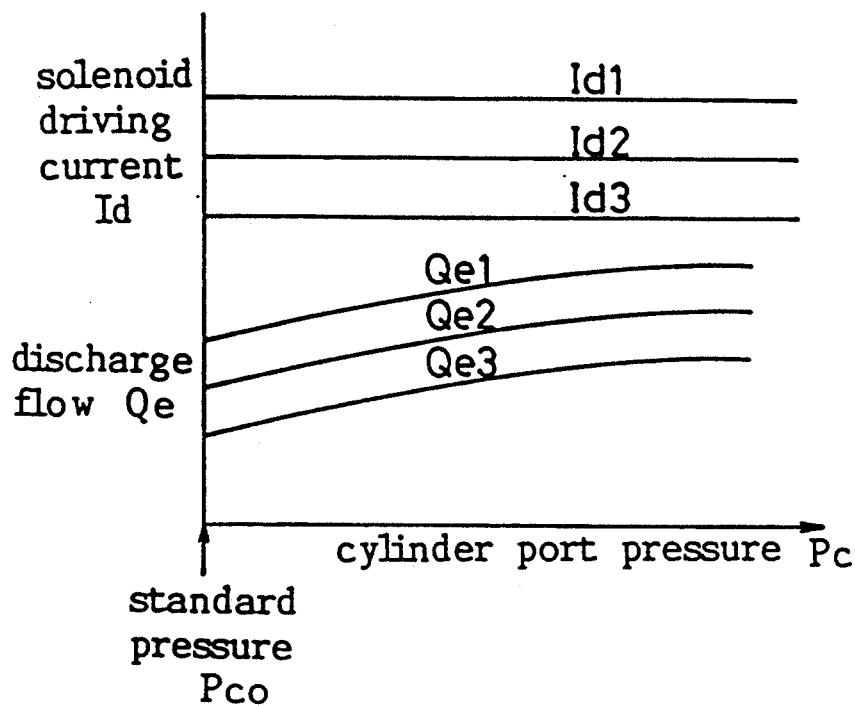
FIG. 11 is a diagram showing relationship of the cylinder port pressure, the solenoid driving current and the discharge flow in the case where the pressure compensation control is not applied.
Figure 12:
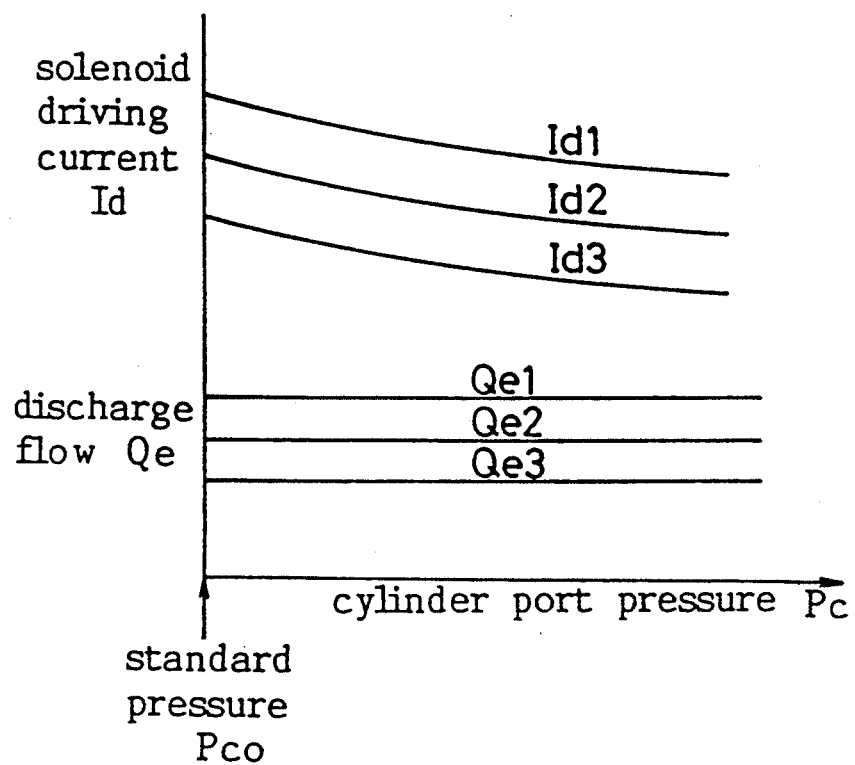
FIG. 12 is a diagram corresponding to FIG. 11 in the case where the pressure compensation control is applied.

Since the cylinder port pressure Pc fluctuates remarkably according to the number of passengers and the weight of luggages in the cage 2, the discharge flow Qe from the second oil passage 16 increases, as shown in FIG. 11, corresponding to the increase of the cylinder port pressure Pc from the standard pressure Pco even if the solenoid driving current Id of the pilot control valve 43 does not fluctuate.

Accordingly, in order to compensate the increase of the discharge flow Qe, the driving current Id is compensated to decrease corresponding to the increase of the cylinder port pressure Pc and the magnitude of driving current Id. The similar control as above is also done for the pilot control valve 33, and the solenoid driving current Iu is compensated to decease corresponding to the increase of the cylinder port pressure Pc and the magnitude of the driving current Iu.

Figure 13:
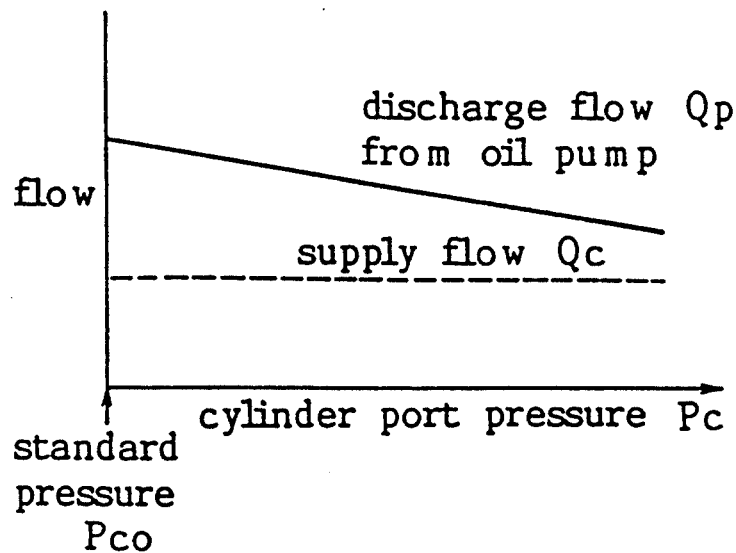
FIG. 13 is a diagram showing relationship of the cylinder port pressure, the discharging flow and the supply flow in the case where the pressure compensation control is not applied.
Figure 14:
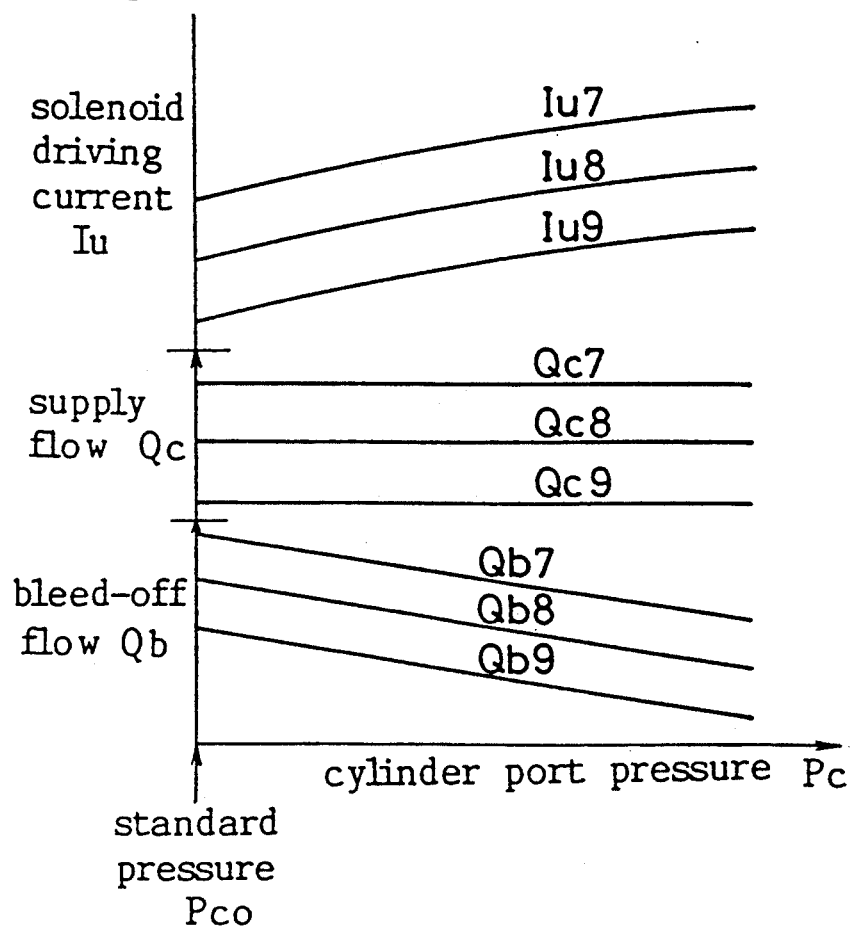
FIG. 14 is a diagram showing the relationship of the cylinder port pressure, the solenoid driving current and the bleed-off flow in the case where pressure compensation control is applied.

Furthermore, since the discharge flow Qp from the oil pump 1 decreases corresponding to the increase of the cylinder port pressure Pc as shown in FIG. 13, the driving current Iu is compensated to decrease corresponding to the increase of the cylinder port pressure Pc and the magnitude of the driving current Iu as shown in FIG. 14, thereby the bleed-off flow Qb is reduced to secure the supply flow Qc. Expressing the compensated amount $\Delta IuP(t)$ of the driving current Iu, which is obtained by the pressure compensation control, as a function of time, the driving current Iu in the formula (2) (shown as a curve LP in FIG. 6) will be modified as follows.

$$Iu = IuO + Idth + \Delta IuT(t) + \Delta IuP(t) \tag{3}$$

The driving current Id is also modified similarly.

Next, descriptions will be made on the pre-starting pressure-up control with reference to FIG. 15–FIG. 18, however the dither current Idth is omitted from the solenoid current Iu shown in FIG. 15 for simplifying descriptions. And this control is carried out additionally to the pressure compensation control. As shown with dotted lines in FIG. 15 and FIG. 16, when the supply of the solenoid driving current Iu to the pilot control valve 33 is started upon receiving of the ascent command, the pressure Pp in the upstream part of the main oil passage 14 increases rapidly up to the bleed-off pressure PBO in the circulating chamber 30b of the flow control valve 30, and then the pressure Pp increases gradually corresponding to the increase of the driving current Iu, and after that when the pressure Pp become higher than the cylinder port pressure Pc, ascending of the cage 2 is started. In such a manner, when the pressure Pp changes rapidly with a large pressure gradient, the pressure wave propagates to the hydraulic cylinder 4, thereby undesirable oscillating acceleration is induced on the cage 2 as shown with a dotted line in FIG. 17. Particularly, in the case where the cylinder port pressure Pc is high due to heavy loading weight in the cage 2, the differential pressure $\Delta P = (Pc - PBO)$ becomes larger, and the oscillating shock is generated at the starting of ascending. The pre-starting pressure-up control is for eliminating the above disadvantage. In this control, as shown with full lines in FIG. 15 and FIG. 16, after receiving the ascent command and before starting of ascending, according to the cylinder port pressure Pc detected with the pressure sensor 57, a pre-starting pressure-up compensated amount $\Delta Ius(t)$ is added to the solenoid driving current Iu, so that the driving current Iu is controlled so as to be equal to the constant pre-starting driving current Ius corresponding to the pressure Pc. The pre-starting driving current Ius is set so as to increase corresponding to the increase of the cylinder port pressure Pc. Thus, the driving current Iu during the time from receiving of the ascent command till starting of ascending, is as follows.

$$Iu = IuO(t) + Idth + \Delta IuT(t) + \Delta IuP(t) + \Delta Ius(t) \tag{3}$$

Since the pre-starting pressure-up compensated amount $\Delta Ius(t)$ is added to the driving current Iu, the opening of the pilot control valve 33 becomes substantively large, and therefore the supply flow Qc increases, and the oil is filled up in the upstream part of the main oil passage 14. Thus, the pressure Pp rises up to a pressure slightly lower than the cylinder port pressure Pc before the cage 2 starts ascending. Consequently, since the pressure gradient at the start of ascending becomes relatively small, the oscillating acceleration induced on the cage 2 becomes extremely small.

Next, descriptions will be made on the pre-starting preceding pressure-up control with reference to FIG. 15. This control is for the same purpose as that of the pre-starting pressure-up control abovementioned, and is applicable only when the oscillation and shock at the starting of ascending can not be eliminated completely with the pre-starting pressure-up control.

Figure 15:
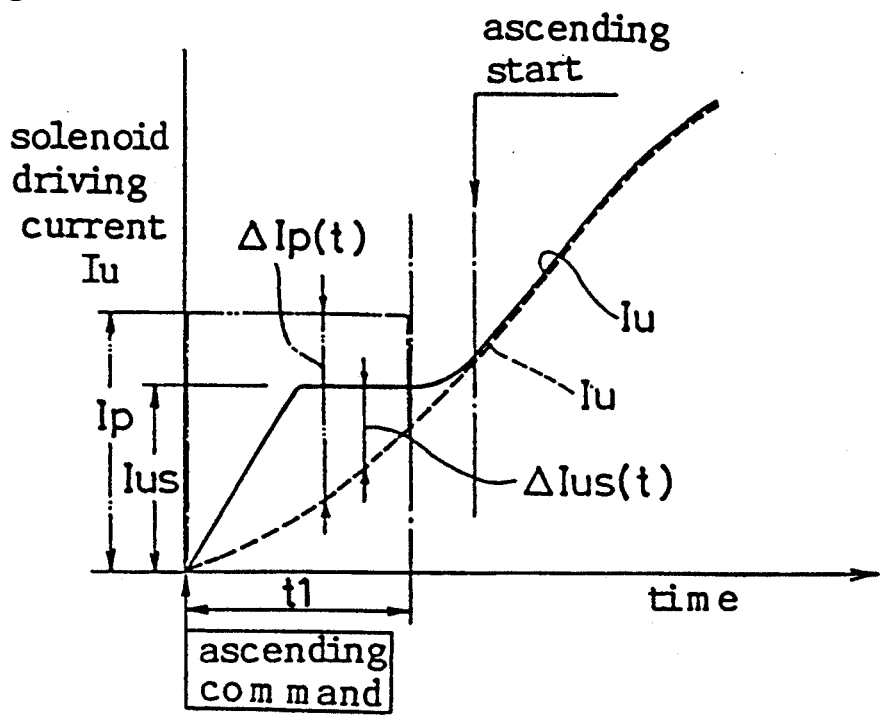
FIG. 15 is an explanatory diagram illustrating compensated amounts for solenoid driving current in pre-starting pressure-up control and pre-starting preceding pressure-up control.
Figure 16:
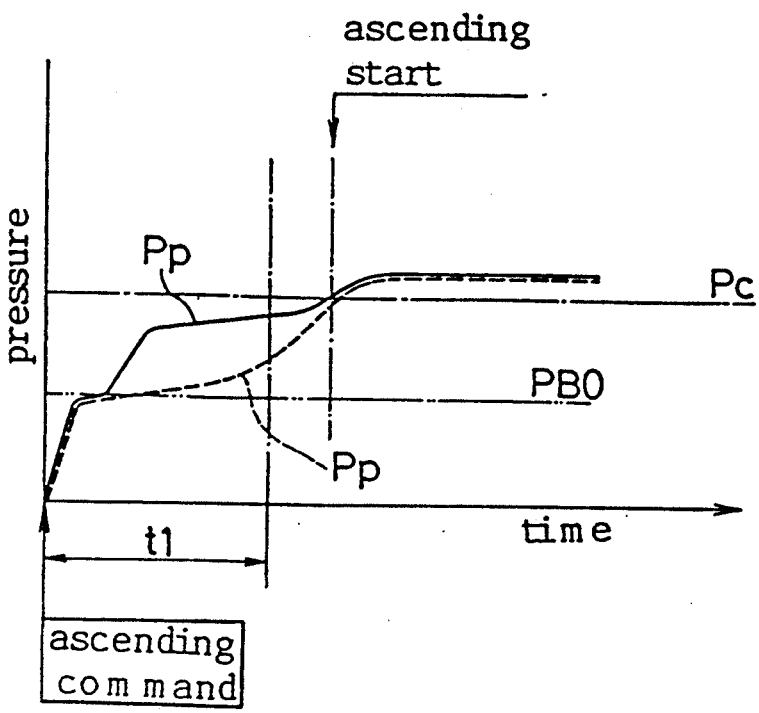
FIG. 16 is a time chart showing change of the oil pressure in pre-starting pressure-up control.
Figure 17:
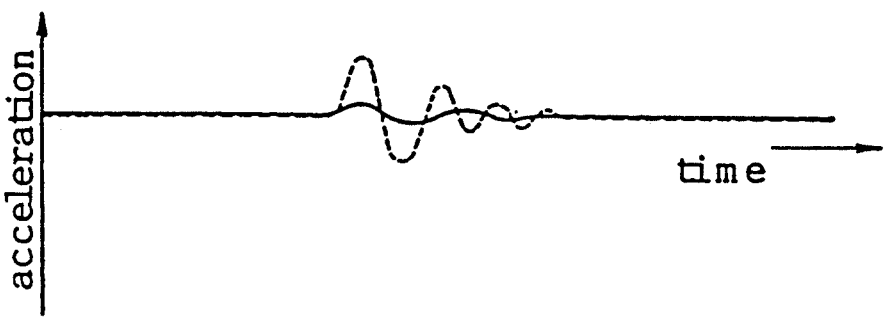
FIG. 17 is a time chart showing the acceleration of the cage relating to pre-starting pressure-up control.
Figure 18:
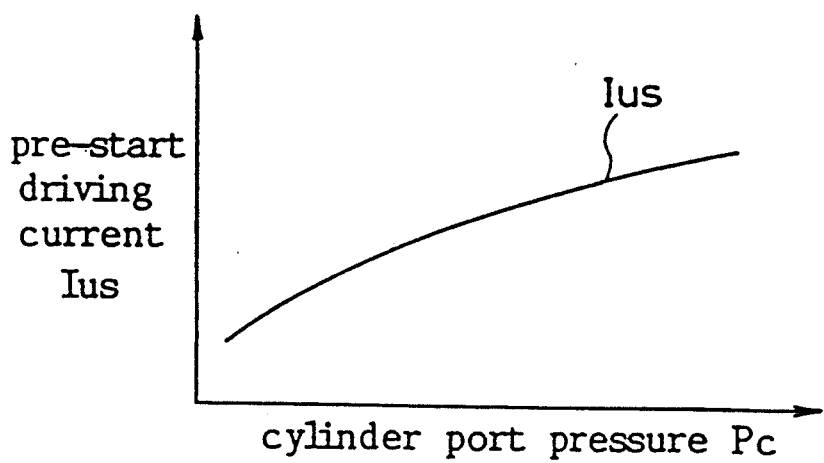
FIG. 18 is a diagram showing relationship between the cylinder port pressure and the pre-starting driving current.

As shown in FIG. 15, a pre-starting preceding pressure-up compensated amount $\Delta Ip(t)$ is added to the solenoid driving current Iu only during the set time t1 after receiving the ascent command, and the driving current Iu is controlled so as to be constant pre-starting preceding driving current Ip corresponding to the cylinder port pressure Pc. Ip is set so as to increase corresponding to the increase of the cylinder port pressure Pc and to be larger than Ius, and that $\Delta Ip(t)$ is supplied prior to $\Delta Ius(t)$ with partially overlapping with $\Delta Ius(t)$. Accordingly, in the case where this compensation is carried out, the driving current Iu for the time after receiving the ascent command till the start of ascending is as follows.

$$Iu = IuO(t) + Idth + \Delta IuT(t) + \Delta IuP(t) + \Delta Ip \tag{4}$$

The driving current Iu in the above formula (4) is applicable only during the set time t1 after receiving of the ascent command, and the driving current Iu for the time after passing of the set time t1 till the start of ascending is given with the formula (3). As described above, in the case where the pre-starting preceding pressure-up compensated amount $\Delta Ip(t)$ is added to the driving current Iu, since the oil amount filled in the upstream part of the main oil passage 14 before the start of ascending increases, the differential pressure $\Delta P = (Pc - PBO)$ before the start of ascending becomes smaller, thereby the ascending can be started more smoothly. Additionally, as shown in FIG. 5, the starting driving current Ids in the start of descending is set smaller by the predetermined amount than the driving current Vdl corresponding to the predetermined low speed Vdl.

Figure 19:
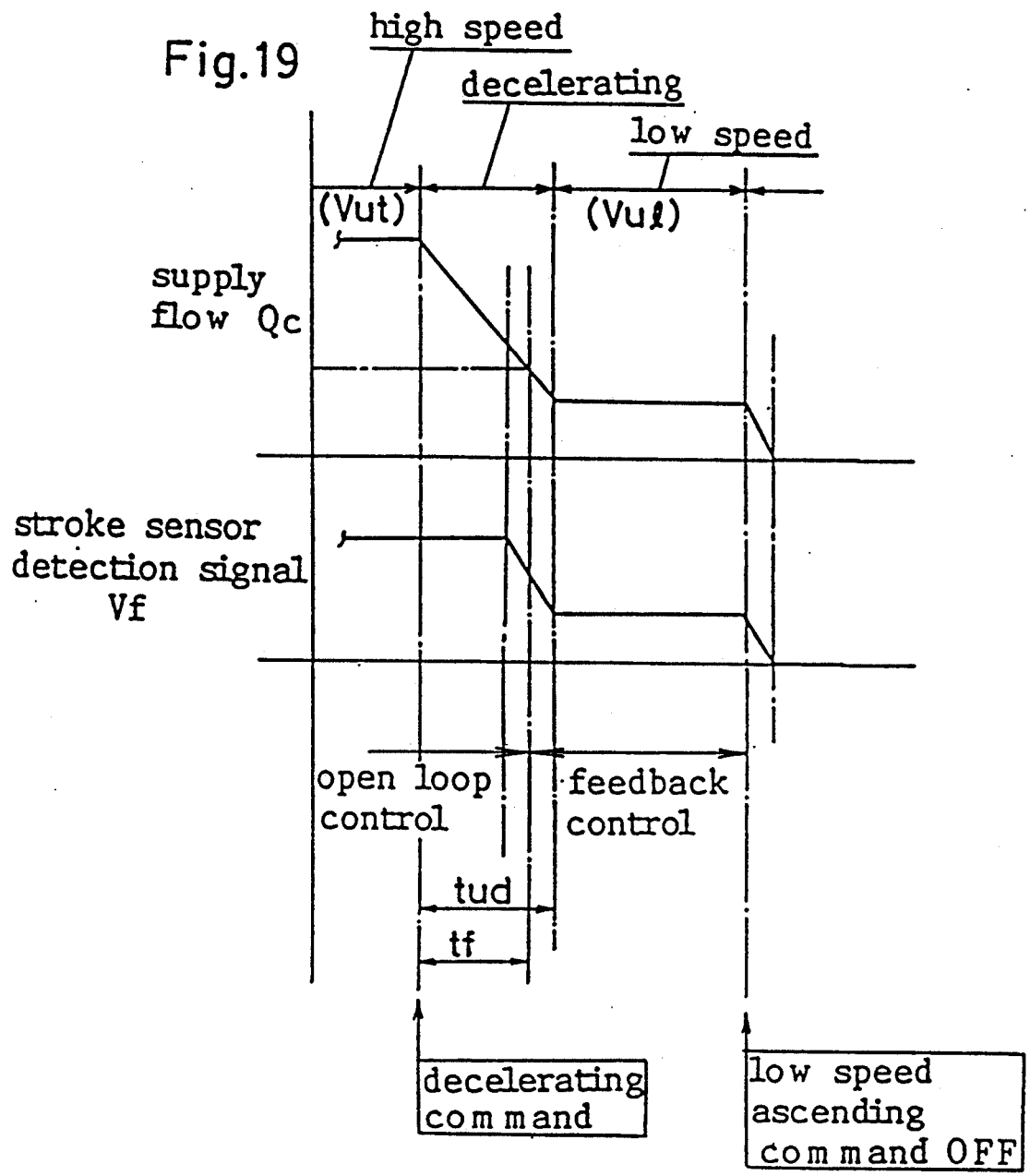
FIG. 19 is an explanatory diagram illustrating the supply flow and the detection signal from the stroke sensor etc. in the supply flow feedback control.
Figure 20:
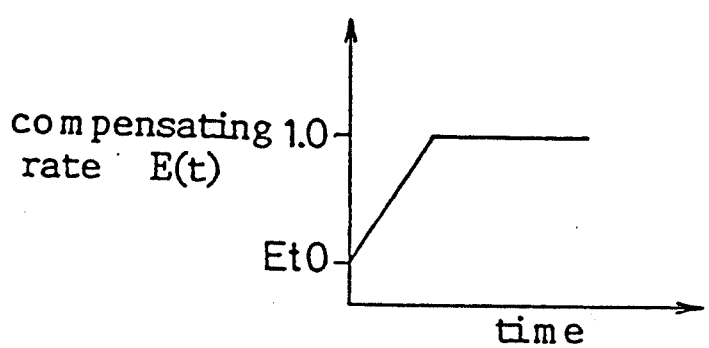
FIG. 20 is a time chart of the compensating rate.

Next, descriptions will be made on the feedback control of the supply flow Qc, which is carried out when the cage 2 is ascending at the low speed after the deceleration in the ascending process, with reference to FIG. 19 and FIG. 20. In the case where the volumetric efficiency of the pump 1 has reduced by the aged deterioration and so on, the supply flow Qc in the low speed ascending becomes insufficient, and the cage 2 can not stop precisely at each of the floor levels. In order to improve such defects, the feed back control of the supply flow Qc, which is described hereinafter, is carried out based on the detection signal of the stroke sensor 55, when the cage 2 ascends at the low speed. As shown in FIG. 3 and FIG. 19, the stroke sensor 55 outputs the detection signal Vf which is proportional to the supply flow Qc not more than the supply flow Qco at the latter stage of the deceleration. With this detection signal Vf, the feedback control is carried out to control the supply flow Qc. This feedback control is done by means of interrupting processing only during the time, from the moment when the predetermined time tf slightly shorter than the set deceleration time tud has passed after receiving the deceleration command (this is equivalent to OFF of the high speed ascent command signal HUS), till turning off of the low speed ascent command signal LUS. In this feedback control, the actual supply flow Qc is detected based on the detection signal from the stroke sensor 55, and the pilot control valve 33 is controlled so as to eliminate the difference between the predetermined supply flow set at the analog volume 70b and the actual supply flow Qc.

Figure 21:
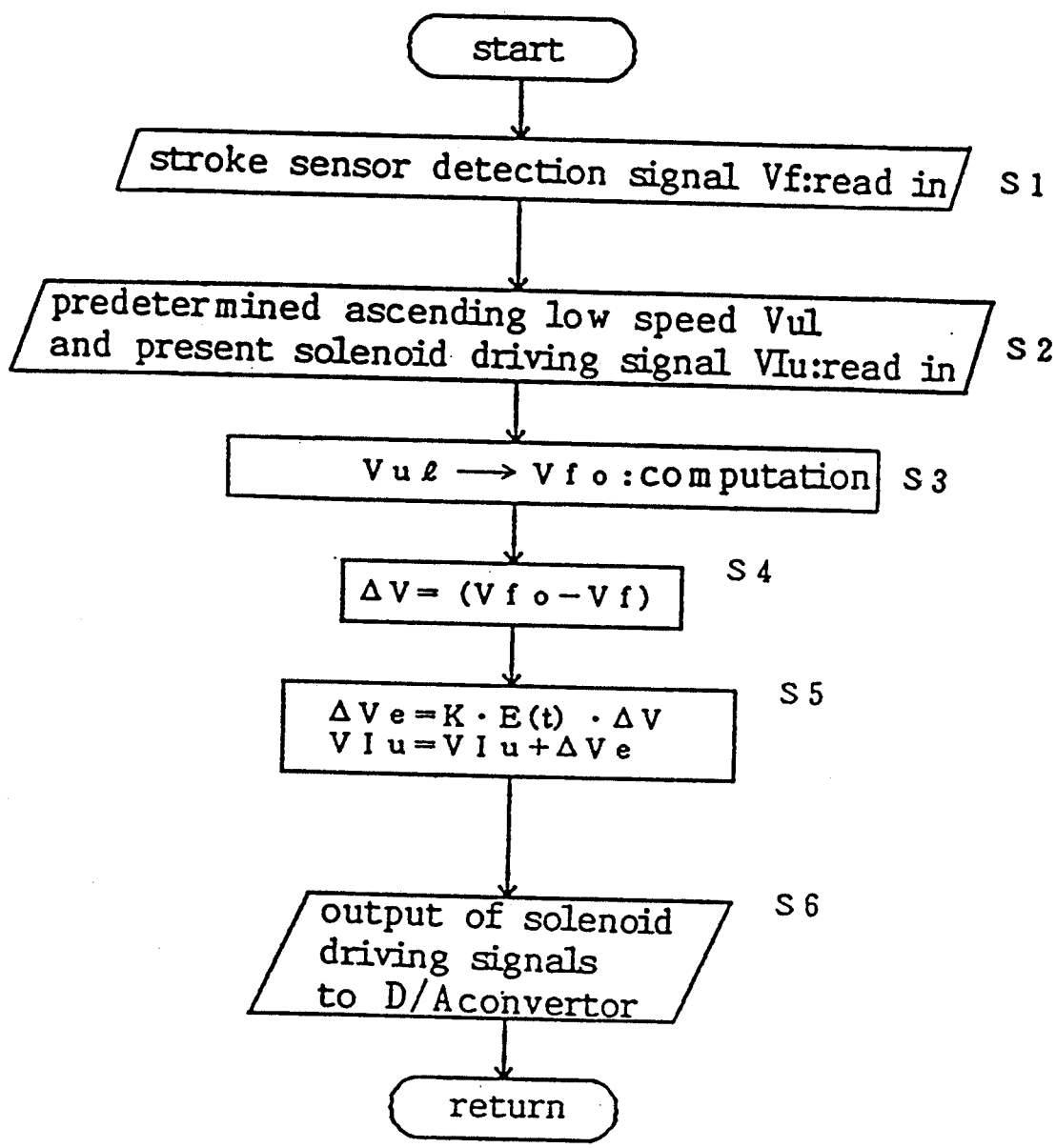
FIG. 21 is a flow chart of control routine of the supply flow feedback control.

Next, descriptions will be made on the control routine of the feedback control with reference to the flow chart in FIG. 21. In FIG. 21, Si (i=1, 2, 3 ...) designates each of steps. The control unit CU processes the feedback control by means of interrupting processing for the above specified time period at respective moment when the solenoid driving current Iu is switched newly, while carrying out the control for the pilot control valves 33 43 and the pilot switching valve 63. After starting of the control, the detection signal Vf is read in from the stroke sensor 55 (S1), and then the ascending low speed Vul set at the analog volume 70b is read in therefrom, and the solenoid driving signal VIu (this is stored in the RAM 90 as a result of computation in the control except this feedback control) which is corresponding to the solenoid driving current Iu to be output at present is read out from the RAM 90 (S2). Then, the signal VfO, which is corresponding to the detection signal Vf of the stroke sensor 55 when the supply flow Qc for securing the speed Vul flows through the check valve 50, is computed based on a predetermined formula (S3), and then $\Delta V$ is computed with a formula $\Delta V = (Vfo - Vf)$. The difference $\Delta V$ is equivalent to the shortage of the supply flow Qc. Then, the compensation signal $\Delta Ve$ is computed with a formula $\Delta Ve = K \cdot E(t) \cdot \Delta V$, and $\Delta Ve$ is added to VIu read out from the RAM 90 (S5). K is a given constant, and E (t) is a compensating rate shown in FIG. 20 for example and this rate E (t) is for preventing rapid fluctuation of the cylinder port pressure Pc on starting of the feedback control. In the control program, the initial compensating rate Eto at the starting of the feedback control is set small and E (t) is set so as to increase gradually up to 1.0 after that. Then, the solenoid driving signal VIu which is compensated by the feedback compensation signal $\Delta Ve$ is output to the D/A converter 94 (S6), and then processing returns to the main routine. This feedback control is carried out repeatedly every minute time interval. Accordingly, in the case where the volumetric efficiency of the hydraulic pump 1 has reduced by the aged deterioration, since the ascending low speed Vul is controlled to be approximately equal to the set speed at the analog volume 70b by above feedback control, the stopping positional accuracy of the cage 2 in ascending can be secured. In the flow chart, reading out of Vul and the calculation of Vfo from Vul are added for better understanding, however Vul and Vfo may be calculated and stored in the memory of the RAM 90 in the initialization of the elevator E. According to the above elevator valve apparatus EV, various advantages can be obtained as follows.

(1) In the ascending and descending process of the cage 2, since the acceleration characteristics Sua·Sda and the deceleration characteristics Sud·Sdd are set to be the S-character pattern, the acceleration and its variable rate at the initial and final stages of the acceleration and deceleration stages are substantively small, thereby the comfortability in riding is improved remarkably.

(2) Since the solenoid driving currents Iu·Id are compensated corresponding to the oil temperature by the oil temperature compensation control, the speed characteristic of the cage 2 does not fluctuate with the fluctuation of the oil temperature.

(3) Since the solenoid driving currents Iu·Id are compensated corresponding to the cylinder port pressure Pc by the pressure compensation control, the speed characteristic of the cage 2 does not fluctuate with the fluctuation of the loading weight in the cage 2.

(4) Since the compensated amount corresponding to the cylinder port pressure Pc is added to the driving current Iu before the start of ascending by the pre-starting pressure-up control and the pressure Pp in the upstream part of the main oil passage 14 is adjusted to be equal to the cylinder port pressure Pc to the utmost, not only the oscillation of the cage 2 at the start of ascending is remarkably improved but also the time delay from receiving of the ascent command signal to the start of ascending is minimized. In case of applying the pre-starting preceding pressure-up control, the above advantages can be strengthened further.

(5) Since, by the feedback control of the supply flow Qc in ascending at the low speed, the driving current Iu is controlled so that the low speed Vul in ascending become equal to the set value, the low speed does not fluctuate even if the performance of the hydraulic pump 1 deteriorates with the long time usage of the elevator E. Thus, the decrease of the stopping accuracy of the cage 2 can be prevented. In addition, the feedback control can be done, without employing a large size flow sensor, with only providing the stroke sensor 55 which is attached to the check valve 50 and is small in size and simple in structure.

Second Embodiment

FIG. 22

Figure 22:
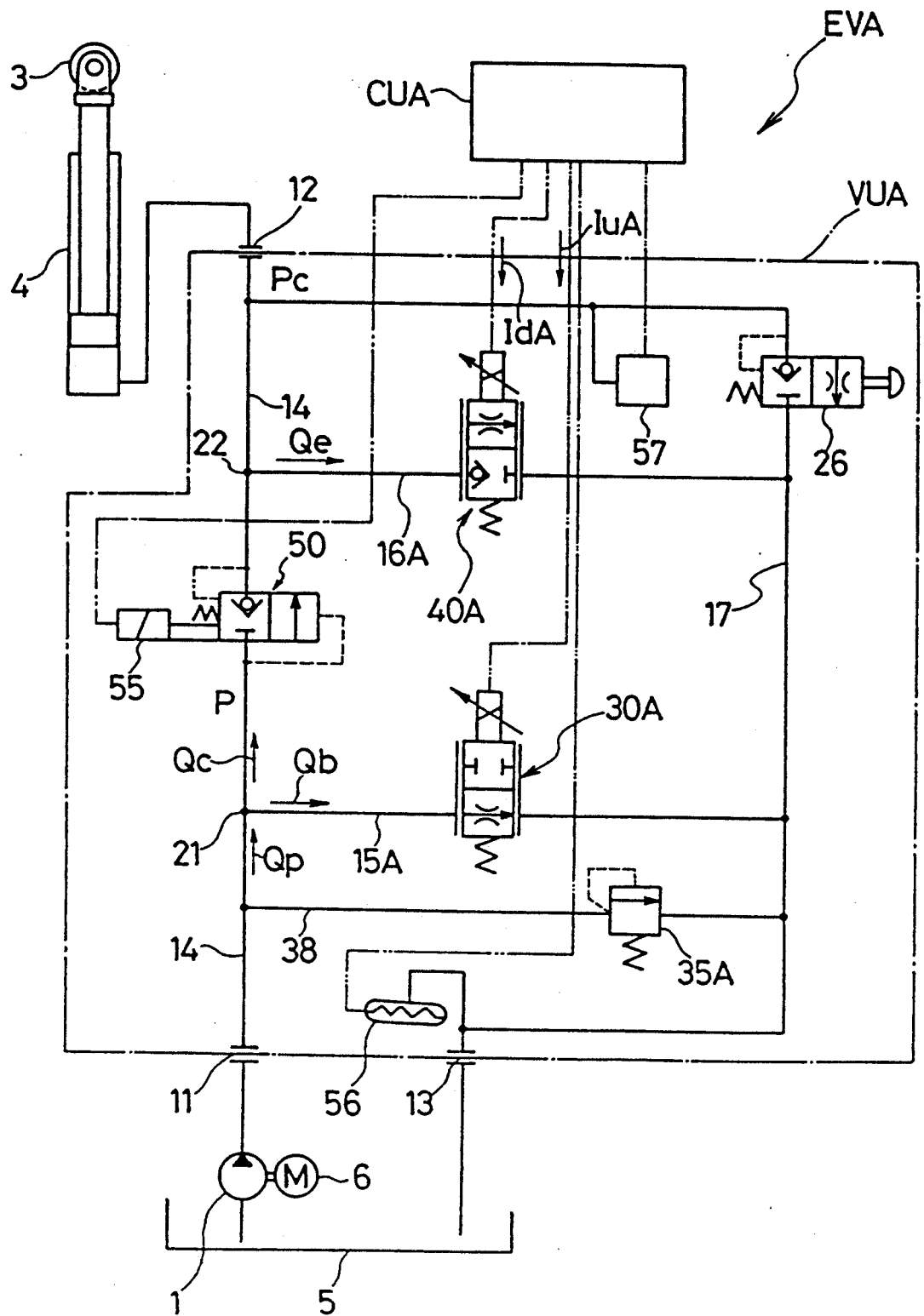
FIG. 22 is an equivalent hydraulic circuit diagram of the elevator valve unit apparatus according to the second embodiment.

FIG. 22 shows an equivalent hydraulic circuit of an elevator valve apparatus EVA according to the second embodiment, in which each of same reference numerals denotes same functional element and each of similar reference numerals denotes similar functional element with the first embodiment, of which description will be omitted, and the different features from the first embodiment will be described for the main hereinafter.

As oil passages, there are provided with the main oil passage 14, a first oil passage 15A branching off from the first branch portion 21 of the upstream part of the main oil passage 14, a second oil passage 16A branching off from the second branch portion 22 of the downstream part of the main oil passage 14, the third oil passage 17, and a fourth oil passage 38 branching off from the upstream part of the main oil passage 14 and extending to the tank port 13.

In the first oil passage 15A, there is provided with a normally open type solenoid proportional flow control valve 30A as a solenoid proportional control valve means for ascending, and in the second oil passage 16A, there is provided with a normally closed type solenoid proportional control valve 40A as a solenoid proportional control valve means for descending.

The flow control valve 30A is opened fully when the solenoid driving current IuA is zero, and all of the discharge flow Qp is bleeded off to the tank 5 through the control valve 30A. The open rate of the control valve 30A decreases in proportion to increase of the driving current IuA, and then the bleed-off flow Qb decreases, and the supply flow Qc increases. Accordingly, by controlling the driving current IuA the supply flow Qc can be controlled, and the ascending speed of the cage 2 can be controlled through the hydraulic cylinder 4, in the same manner as the solenoid proportional control valve means for ascending in the first embodiment.

The flow control valve 40A is closed fully when the solenoid driving current IdA is zero, and the discharge flow Qe is zero. Then, the open rate of the control valve 40A increases in proportion to increase of the driving current IdA, and the discharge flow Qe through the control valve 40A increases. Accordingly, by controlling the driving current IdA it is possible to control the discharge flow Qe from the hydraulic cylinder 4 to the tank 6 through the main oil passage 14 and second oil passage 16A, and thus the descending speed of the cage 2 can be controlled through the hydraulic cylinder 4, in the same manner as the solenoid proportional control valve means for descending in the first embodiment.

Same as the first embodiment, there are provided with the check valve 50, the stroke sensor 55, the oil temperature sensor 56, and the pressure sensor 57. And the same various controls as those done by the control unit CU of the first embodiment are carried out by a control unit CUA.

The solenoid driving currents IuA·IdA are larger than the solenoid driving current Iu·Id in the first embodiment, however, this will be solved by setting the amplifying rate of the output circuit 102 larger. Therefore, in principle, the control unit CUA may be constituted approximately same as the control unit CU. In this embodiment, the auxiliary check valve 60 and the pilot switching valve 63 are omitted, however these valves 60.63 may be provided, if preferable.

What is claimed is:

1. An elevator valve apparatus installed in a hydraulic circuit which communicates a hydraulic actuator for driving an elevator cage to ascend and descend and a fixed discharge hydraulic pump for supplying hydraulic oil to the hydraulic actuator, said elevator valve apparatus being characterized by comprising:
   a main oil passage for communicating a pump port and an actuator port;
   a solenoid proportional control valve means for ascending of normally open type for controlling bleed-off flow bleeded off from the hydraulic oil supplied to the main oil passage from the hydraulic pump;
   a solenoid proportional control valve means for descending for controlling discharge flow discharged from the hydraulic actuator;
   a check valve, which is disposed in the main oil passage for preventing the hydraulic oil from flowing from the hydraulic actuator to the solenoid proportional control valve means for ascending, of which valve body movement stroke vs. flow characteristic is linear in a range not more than a predetermined flow;
   a stroke sensor for detecting the moving stroke of the valve body of the check valve;
   a valve control means for controlling both of the solenoid proportional control valve means for ascending and for descending with a predetermined acceleration characteristic and a deceleration characteristic, based on command signals supplied from outside for commanding at least start, ascent or descent, start of deceleration, and stop; and
   a feedback compensation control means for compensating a control signal controlling the solenoid proportional control valve means for ascending when the cage ascends at a low speed after deceleration so that actual hydraulic flow to the hydraulic actuator becomes equal to predetermined hydraulic flow for low speed ascending, based on an output from the stroke sensor.

2. An elevator valve apparatus according to claim 1, wherein the valve control means is constituted so as to control both of the solenoid proportional control valve means with a predetermined S-character pattern acceleration characteristic and an S-character pattern deceleration characteristic.

3. An elevator valve apparatus according to claim 1, further comprises an oil temperature detecting means for detecting oil temperature of the hydraulic oil, and the valve control means further comprises a temperature compensation means for compensating the control signal controlling the solenoid proportional valve means for ascending and a control signal controlling the solenoid proportional control valve means for descending, based on an output from the oil temperature detecting means.

4. An elevator valve apparatus according to claim 1, further comprises an oil pressure detecting means for detecting an oil pressure applied to the hydraulic actuator, and the valve control means further comprises a pressure compensation means for compensating the control signal controlling the solenoid proportional control valve means for ascending and a control signal controlling the solenoid proportional control valve means for descending, based on an output from the oil pressure detecting means.

5. An elevator valve apparatus according to claim 4, wherein the valve control means further comprises a pressure raising compensation means for compensating the control signal controlling the solenoid proportional control valve means for ascending before starting of ascending of the cage by means of calculating a pre-start pressure raising signal based on the oil pressure before starting of ascending of the cage and then adding the pre-start pressure raising signal to the control signal.

6. An elevator valve apparatus according to claim 5, wherein the valve control means further comprises a preceding pressure raising compensation means for compensating the control signal controlling the solenoid proportional control valve means for ascending before starting of ascending of the cage by means of calculating a pre-start prior preceding pressure raising signal larger than the pre-start pressure raising signal based on the oil pressure before starting of ascending of the cage and then adding the pre-start preceding pressure raising signal to the control signal.

7. An elevator valve apparatus according to claim 1, wherein the solenoid proportional control valve means for ascending comprises a flow control valve for ascending connected to an upstream part of the main oil passage, a pilot oil passage for the flow control valve which is connected to the main oil passage at an upstream part upper than the check valve, and a first fixed choke which are disposed in series from an upstream side of the pilot oil passage, and the solenoid proportional control valve means is constituted so as to apply a pilot pressure in a downstream side of the first fixed choke to a pilot chamber of the flow control valve for ascending.

8. An elevator valve apparatus according to claim 1, wherein the solenoid proportional control valve means for descending comprises a flow control valve for descending connected to a downstream part of the main oil passage, a pilot oil passage for the flow control valve for descending which is connected to the main oil passage at a downstream part lower than the check valve, and a first fixed choke and a solenoid proportional pilot valve and a second fixed choke which are disposed in series from an upstream side of the pilot oil passage, and the solenoid proportional valve means is constituted so as to apply a pilot pressure in a downstream side of the first fixed choke to a pilot chamber of the flow control valve for descending.

9. An elevator valve apparatus installed in a hydraulic circuit which communicates a hydraulic actuator for driving an elevator cage to ascend and descend and a fixed discharge hydraulic pump for supplying hydraulic oil to the hydraulic actuator, said elevator valve apparatus being characterized by comprising:

a main oil passage for communicating a pump port and an actuator port;

a solenoid proportional control valve means for ascending of normally open type for controlling bleed-off flow bleeded off from the hydraulic oil supplied to the main oil passage from the hydraulic pump;

a solenoid proportional control valve means for descending for controlling discharge flow discharged from the hydraulic actuator;

a valve control means for controlling both of the solenoid proportional control valve means for ascending and descending with a predetermined S-character pattern acceleration characteristic and a S-character pattern deceleration characteristic, based on command signals supplied from outside for commanding at least start, ascent or descent, start of deceleration, and stop;

an oil pressure detecting means for detecting an oil pressure applied to the hydraulic actuator, and the valve control means further comprises a pressure compensation means for compensating a control signal controlling the solenoid proportional control valve means for ascending and a control signal controlling the solenoid proportional control valve means for descending, based on an output from the oil pressure detecting means;

wherein the valve control means comprises:

pressure raising compensation means for compensating the control signal controlling the solenoid proportional control valve means for ascending before starting of ascending of the cage, by means of calculating a pre-start pressure raising signal based on the detected oil pressure from the oil pressure detecting means before starting of ascending of the cage and then adding the pre-start pressure raising signal to the control signal; and a preceding pressure raising compensation means for compensating the control signal controlling the solenoid proportional control valve measn for ascending before starting of ascending of the cage, by means of calculating a pre-start preceding pressure raising signal larger the pre-start pressure raising signal based on the detected oil pressure from the oil pressure detecting means before starting of ascending of the cage and then adding the pre-start preceding pressure raising signal to the control signal.

* * * * *